US007476370B2

(12) United States Patent
Mitsugashira et al.

(10) Patent No.: US 7,476,370 B2
(45) Date of Patent: Jan. 13, 2009

(54) METHOD FOR PRODUCING A SEALED $^{210}$PB—$^{210}$PO ALPHA PARTICLE EMITTER

(76) Inventors: Hiroaki Mitsugashira, 80-4, Aza Kurahigashi, Aikuma Kouya, Watari-machi, Watari-gun, Miyagi-ken, 989-2324 (JP); Noriyoshi Tsuyuzaki, 1820 Hayano, Mobara-shi, Chiba-ken, 297-0037 (JP)

( * ) Notice: Subject to any disclaimer, the term of this patent is extended or adjusted under 35 U.S.C. 154(b) by 449 days.

(21) Appl. No.: 10/560,922

(22) PCT Filed: Jun. 9, 2004

(86) PCT No.: PCT/JP2004/008407

§ 371 (c)(1),
(2), (4) Date: Dec. 15, 2005

(87) PCT Pub. No.: WO2004/114324

PCT Pub. Date: Dec. 29, 2004

(65) Prior Publication Data

US 2007/0098606 A1 May 3, 2007

(30) Foreign Application Priority Data

Jun. 19, 2003 (JP) ............................ 2003-174296

(51) Int. Cl.
*C01G 56/00* (2006.01)

(52) U.S. Cl. .......................................... 423/2; 423/274

(58) Field of Classification Search ..................... 423/2, 423/274; 427/212, 215, 444
See application file for complete search history.

(56) References Cited

U.S. PATENT DOCUMENTS

| | | | | |
|---|---|---|---|---|
| 3,758,663 | A | 9/1973 | Kirby | 423/2 |
| 3,873,651 | A | 3/1975 | Mosley, Jr. et al. | 264/0.5 |
| 3,983,219 | A | 9/1976 | Chong et al. | 423/249 |

FOREIGN PATENT DOCUMENTS

| | | | |
|---|---|---|---|
| DE | 100 02 113 | A1 | 8/2000 |
| GB | 636338 | | 4/1950 |
| JP | 6-99003 | A | 12/1994 |
| JP | 2002-265206 | A | 9/2002 |

OTHER PUBLICATIONS

Hirose, N. et al., "Collection of emanating $^{222}$Rn for the preparation of a $^{210}$Pb-$^{210}$Po alpha-source and the building of a mobile random pulse and probability generator utilizing alpha-counting technique", *Journal of Radioanalytical and Nuclear Chemistry*, vol. 255, No. 1 (2003) pp. 207-210.

*Primary Examiner*—Steven Bos
(74) *Attorney, Agent, or Firm*—Kubovcik & Kubovcik

(57) ABSTRACT

The present invention provides a method for producing a sealed $^{210}$Pb—$^{210}$Po α source (α particle emitter) and an apparatus thereof, which can be used as an α particle source for a random pulse generator. The method for producing a sealed $^{210}$Pb—$^{210}$Po α source (α particle emitter) includes the steps of: collecting $^{210}$Pb—$^{210}$Po with a $^{210}$Pb collector using radon collection; precipitating the hydroxides of the collected $^{210}$Pb—$^{210}$Po and collecting the precipitates by a polycarbonate (PC) filter; dissolving the $^{210}$Pb—$^{210}$Po hydroxide precipitate to form a $^{210}$Pb—$^{210}$Po radioactive thin film; and sealing the $^{210}$Pb—$^{210}$Po radioactive thin film for protection.

14 Claims, 2 Drawing Sheets

METHOD FOR PRODUCING A SEALED $^{210}$PB—$^{210}$PO ALPHA PARTICLE EMITTER

This application is a 371 of international application PCT/JP2004/008407, which claims priority based on Japanese patent application No. 2003-174296 filed on Jun. 19, 2003, which is incorporated herein by reference.

TECHNICAL FIELD

The present invention relates to a method for producing an α particle emitter, and an apparatus thereof, which can be used as an α source for a random pulse generator by trapping atoms generated from a naturally existing decaying radioactive substance, wherein control of the number of atoms is carried out to set these trapped atoms to a certain intensity.

BACKGROUND ART

A conventional method for producing an α particle emitter involves sandwiching an α emitter between cover members to seal for use in a smoke detector, rolling and stretching it with the cover members and cutting them into a predetermined shape to complete when a predetermined density in the number of atoms was reached. Other methods have been proposed (see, for example, Patent Document 1: Method for Collecting Radon), in which metal atoms serving as an α emitter are trapped in a solution state by cooling trapped radon gas with liquid nitrogen to cooling trapped radon gas with liquid nitrogen to liquefy it.

Patent Document 1: Japanese Patent Application Laid-Open No. 2002-265206

DISCLOSURE OF THE INVENTION

However, these conventional methods required a step of controlling the density of the α emitter in which the α emitter was sandwiched between gold material and silver material then rolled until a certain radiation source intensity was reached, meaning that a special apparatus was necessary. This had the drawback that costs would inevitably rise.

It is an object of the present invention to provide a method for producing a sealed α emitter source, and an apparatus thereof, which uses already established reliable technology that is easy to use and low-cost.

The present invention relates to a method for producing a sealed $^{210}$Pb—$^{210}$Po α source (α particle emitter) which comprises the steps of: collecting $^{210}$Pb—$^{210}$Po with a $^{210}$Pb collector using radon collection; precipitating the hydroxides of the collected $^{210}$Pb—$^{210}$Po and collecting the precipitates using a polycarbonate (PC) filter; dissolving the $^{210}$Pb—$^{210}$Po hydroxide precipitates to form a $^{210}$Pb—$^{210}$Po radioactive thin film; and sealing the $^{210}$Pb—$^{210}$Po radioactive thin film for protection.

Specifically, the method for producing a sealed $^{210}$Pb—$^{210}$Po α source (α particle emitter) according to the present invention comprises the following steps.

The first step is a process wherein a substance containing uranium series radioactive nuclides such as radium is used as a $^{222}$Rn source, $^{222}$Rn generated from the $^{222}$Rn source is passed along with a carrier gas such as nitrogen or dry air through a cold trap that is cooled to a temperature at or below the boiling point of $^{222}$Rn (−62° C.), to liquefy the $^{222}$Rn, and $^{210}$Pb—$^{210}$Po among daughter nuclides generated by the decay of this liquefied $^{222}$Rn is collected by taking the $^{210}$Pb—$^{210}$Po adhering to the cold trap wall sides or remaining in the cold trap, which has returned to room temperature, into a solution using a solvent such as a nitric acid solution for collecting.

The second step is a process in which a hydroxide precipitate is prepared by adding excess ammonium hydroxide solution to nitric acid, hydrochloric acid or sulfuric acid solution containing $^{210}$Pb and $^{210}$Po, which is a nuclide generated from decay of the $^{210}$Pb, the precipitate is settled, and then the $^{210}$Pb and $^{210}$Po made into the hydroxide precipitate is collected using a polycarbonate (PC) filter.

The third step is a dissolving process in which a preferably 1:1 liquid mixture of dichloroethane and dichloromethane is used to dissolve the filter made of polycarbonate material. Metal atoms trapped in the polycarbonate are taken into the solution by dissolution of the polycarbonate. The compounds dichloroethane and dichloromethane adhere (bond) around the metal atoms, and extraction of the metal atoms is possible by extracting the solution. The third step also involves a process for forming a thin film of 1 micron or less by dripping this solution and allowing it to air dry.

The fourth step is a process in which the $^{210}$Pb—$^{210}$Po radioactive thin film formed in the above-described step is sealed by dissolving the PC filter in a preferably 1:1 liquid mixture of dichloroethane and dichloromethane, and then dripping the liquid onto the membrane formed in the above-described step to form a thin film of 1 micron or less for protection.

In the method for producing a sealed $^{210}$Pb—$^{210}$Po α source (α particle emitter) according to the present invention, the atomic weight of the metals $^{210}$Pb and $^{210}$Po can be controlled by controlling the drip amount of the solution in which metal atoms are dissolved. The specific order of the procedures is as follows.

1. Measure the weight of the membrane filter;

2. Measure the number of atoms of the $^{210}$Pb—$^{210}$Po trapped by the membrane filter;

This measurement is carried out by measuring gamma radiation that the trapped $^{210}$Pb—$^{210}$Po emits, wherein the radon atomic weight trapped in the filter from the radon trapping start by the cold trap to the trapping end can be calculated (radon being a parent nuclide of $^{210}$Pb—$^{210}$Po).

3. Measure the weight (mass) of the solution which dissolves the filter;

4. Determine the concentration of $^{210}$Pb—$^{210}$Po in solution from the number of trapped atoms of the $^{210}$Pb—$^{210}$Po and the weight of the solution;

5. Determine the necessary α particle number, calculate the solution amount which corresponds to this α particle number, and drip the equivalent amount onto a predetermined position using a pipette or the like;

6. Dry the dripped portion to evaporate off organic solvent.

The present invention further relates to a $^{210}$Pb collector which uses radon collection for collecting $^{210}$Pb—$^{210}$Po. This collector comprises a $^{222}$Rn source which includes a substance containing uranium series radioactive nuclides such as radium; a moisture trap for collecting $^{222}$Rn gas generated by the $^{222}$Rn source along with carrier gas such as nitrogen or dry air and sending only pure radon gas to a cold trap; and a $^{222}$Rn collector trap for liquefying the $^{222}$Rn gas by cooling to a temperature of a boiling point of $^{222}$Rn (−62° C.) or lower and then generating $^{210}Pb$ and $^{210}Po$ which have a relatively long half-life among daughter nuclides generated from decay of the $^{222}Rn$.

BEST MODE FOR CARRYING OUT THE INVENTION

Now, embodiments of the method for producing a sealed $^{210}Pb$—$^{210}Po$ $\alpha$ source ($\alpha$ particle emitter) in accordance with the present invention, and an apparatus thereof, will be described in detail with reference to the drawings.

The process of the first step will now be described.

Figure 1:
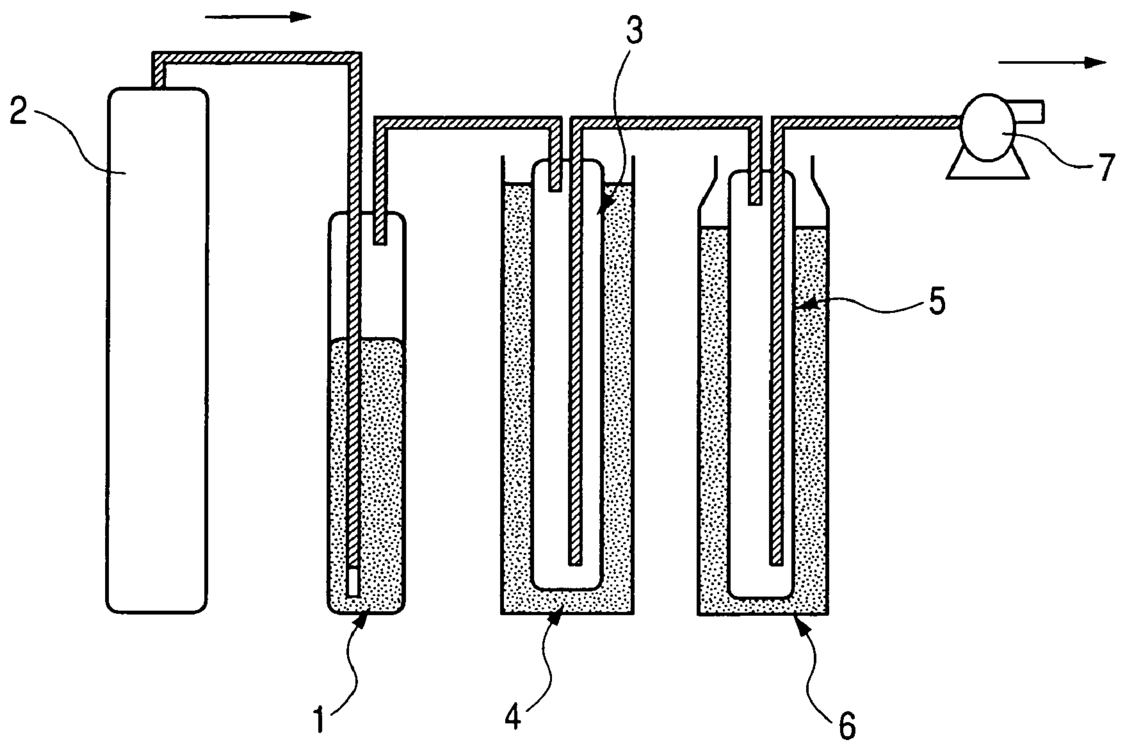
FIG. 1 is a schematic view illustrating one example of a $^{210}Pb$ collector using radon collection used in the present invention.

As illustrated in FIG. 1, a substance containing uranium series radioactive nuclides such as natural uranium ore powder 1 or radium which serve as a $^{222}Rn$ source is charged into a container. Uranium ore powder, left over soil from a uranium mine, left over soil generated during a uranium refining process and a radium source are effective as this substance. To introduce $^{222}Rn$ generated by the $^{222}Rn$ source into the cold trap, a carrier gas 2 such as nitrogen or dry air and a pump 7 for suction are used. The gas from the $^{222}Rn$ source is first led to a moisture trap (water content trap) 3. The moisture trap is an apparatus which collects vapor and moisture released at the same time as the $^{222}Rn$ to allow only pure radon gas to be sent to the cold trap. The moisture trap is an apparatus which has a function to freeze moisture released by the $^{222}Rn$ source so that it adheres to the walls for removal by cooling using dry ice or methanol 4 to −20° C. or below. While not shown in the diagram, a honeycomb, thin pipe or mesh structure may be used, wherein an optimal combination can be achieved among the gas passage, the coolant temperature and conductance from the structure material. It is important that the cold trap operating temperature is set in a range below zero so that $^{222}Rn$ is not trapped and above the boiling point temperature of $^{222}Rn$ (−62° C.).

It is important that the pipe from the moisture trap to the $^{222}Rn$ collector trap 5 is protected as much as possible with insulation material so that the exit gas temperature of the moisture trap 3 does not rise during the distance to the $^{222}Rn$ collector trap. This is an important factor in raising cooling efficiency of the $^{222}Rn$ collector trap. Gas which has exited the moisture trap enters a cold trap, which is the $^{222}Rn$ collector trap 5. The cold trap uses liquid nitrogen 6 to cool the temperature below the boiling point of $^{222}Rn$ (−62° C.). Gas mainly comprising $^{222}Rn$ that has had moisture removed by the moisture trap is liquefied in the cold trap of the $^{222}Rn$ collector trap. The same structures used for the moisture trap, honeycomb, fine pipe and mesh, may be used to allow efficient cooling for liquefying.

The collecting period is preferably carried out continuously for roughly 12 days to 1 month, in view of the half-lives of $^{222}Rn$ (3.82 days) and $^{210}Pb$ (22.3 years) (the radioactivity amount of the $^{210}Pb$ generated by the decay of $^{222}Rn$ is about 1/2000th that of the total radioactivity amount of $^{222}Rn$), although this can be adjusted depending on the required $^{210}Pb$ source intensity and the $^{222}Rn$ gas generation rate.

Daughter nuclides ($^{218}Po$, $^{214}Pb$, $^{214}Bi$, $^{214}Po$, $^{210}Pb$, $^{210}Bi$, $^{210}Po$) are generated from the decay of this liquefied $^{222}Rn$ and the decay of the gas inside the cold trap in the $^{222}Rn$ solution and on the wall surface. These daughter nuclides also decay according to their half-life, so that mainly $^{210}Pb$ and $^{210}Po$, which have a relatively long half-life, are generated. The above-described cold trap in which collection was carried out for a fixed period is maintained for approximately 40 days at low temperature in view of the 3.82 day half-life of $^{222}Rn$. After allowing 99.9% or more of the $^{222}Rn$ to dissipate away, the temperature is gradually returned to room temperature, wherein the extremely minute amount of remaining radon is released in the gas-phase and the $^{210}Pb$—$^{210}Po$ adhering to the cold trap walls or remaining $^{210}Pb$—$^{210}Po$ is dissolved with a solvent such as a nitric acid solution. This is a $^{210}Pb$—$^{210}Po$ collecting process characterized in that this solution is extracted along with $^{210}Pb$—$^{210}Po$ contained in the solution.

In place of natural uranium ore, radon or radon-generating radium can be used. Radon may be a gas which includes $^{222}Rn$, or may be a gas which can be trapped in a basement, a cave, a uranium deposit and the like. It is not necessary for the radon to be 100% radon. Further, radium which generates $^{222}Rn$ ($^{226}Ra$) and radon which is generated from minerals or rocks containing radium are also acceptable.

Polonium, bismuth and lead that are generated from the decay of radon are part of the uranium series and are inevitably formed. Each of the generated atoms is made to decay to $^{210}Pb$ without splitting, and allowed to progress for 1.5 to 2 years to set up a $^{210}Pb$—$^{210}Po$ radioactive equilibrium in which the half-life of the $\alpha$ particles released from the $^{210}Po$ is shortened to 22.3 years as though it was the half-life of $^{210}Pb$. This $^{210}Pb$—$^{210}Po$ serves as the $\alpha$ emitter.

Next, the process of the second step will be described.

A hydroxide precipitate is prepared by adding excess ammonium hydroxide solution to a nitric acid solution containing the $^{210}Pb$ prepared in the above-described step and $^{210}Po$ which is a nuclide generated from the decay of $^{210}Pb$ (the following explanation will use a nitric acid solution as a representative example). The nitric acid solution containing $^{210}Pb$ and $^{210}Po$, which is a nuclide generated from the decay thereof, may be prepared by dissolution with a nitric acid solution in order to extract the $^{210}Pb$—$^{210}Po$ metal atoms trapped in the process of the first step. Alternatively, a $^{226}Ra$ ampule source, which has long been used as a radiation source in medicine, may be used, wherein the $^{210}Pb$—$^{210}Po$ generated within the ampule is dissolved with a nitric acid solution.

Once the precipitate has been allowed to settle, $^{210}Pb$—$^{210}Po$ in the form of a hydroxide precipitate is passed through a polycarbonate (PC) membrane filter to trap the precipitate in the filter. Sufficiently precipitated hydroxide is poured along with the solution into a container that is equipped with a PC filter, wherein the hydroxide is separated from the solution by the filter through suction from the filter exit side.

A surface collection type 0.1 μm Nuclepore polycarbonate filter is used as the polycarbonate filter. This filter may be used by mounting on an upper surface of a filter unit made of Nalgen Nunc International or the like (a nitrocellulose filter having an effective filtration surface diameter of 45 mm and an aperture diameter of 0.2 μm).

Next, the process of the third step will be described.

The third step is a dissolving method which uses a preferably 1:1 liquid mixture of dichloroethane and dichloromethane to dissolve the filter made from polycarbonate material.

Figure 2:
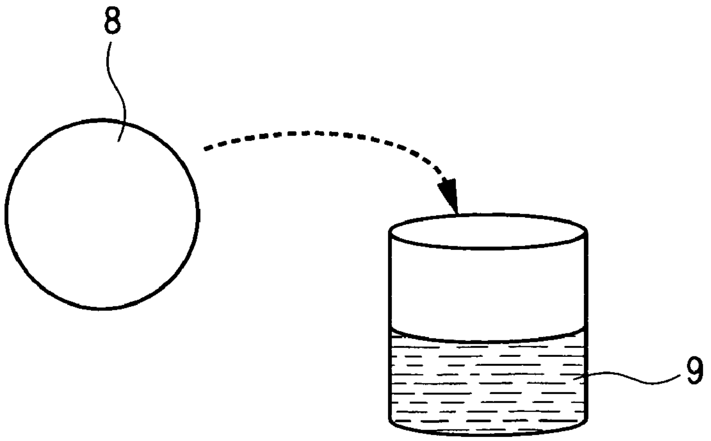
FIG. 2 is a schematic view illustrating one example of a dissolving method for a PC filter according to the present invention.

A PC filter 8 which trapped the $^{210}$Pb and $^{210}$Po as a hydroxide precipitate is dissolved by a preferably 1:1 liquid mixture 9 of dichloroethane and dichloromethane. Metal atoms trapped in the hydroxide are taken into the solution by dissolving the polycarbonate. Extraction of the metal atoms is made possible by the compounds dichloroethane and dichloromethane adhering (bonding) around the metal atoms to extract the solution. Dissolution of the PC filter is illustrated in FIG. 2.

Figure 3:
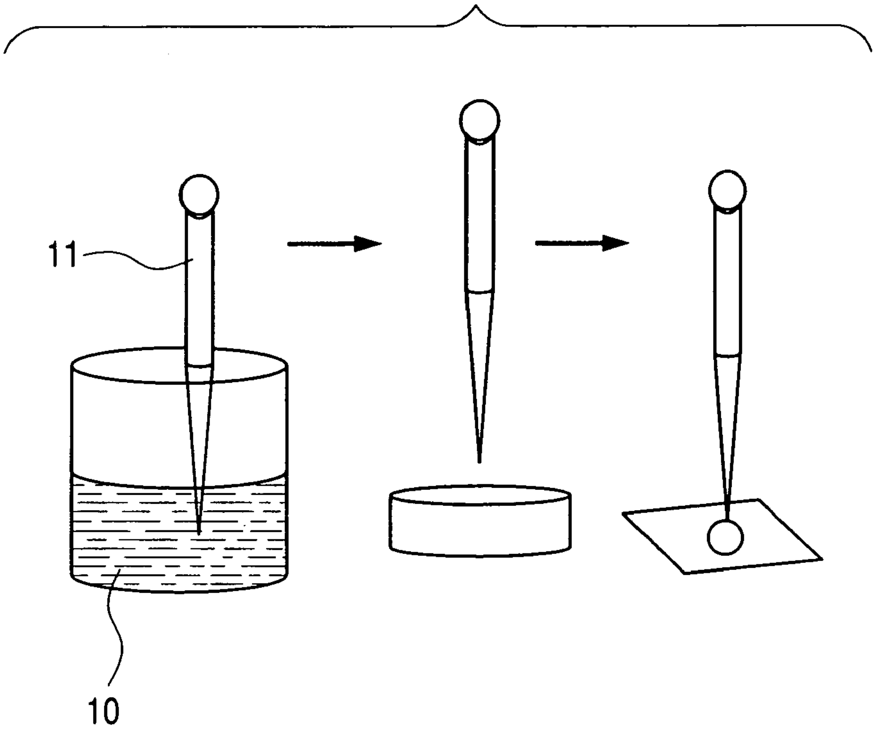
FIG. 3 is a schematic view illustrating one example of the procedures from filter dissolution to thin film formation according to the present invention.

A solution 10 in which the PC filter that trapped the hydroxide is dissolved contains $^{210}$Pb—$^{210}$Po, which is extracted by a pipette 11 or the like, dripped onto an aluminum plate or an inner side of a cap of a detector and allowed to air dry to form a thin film of 1 μm or less. This procedure is illustrated in FIG. 3.

Next, the process of the fourth step will be described.

Figure 4:
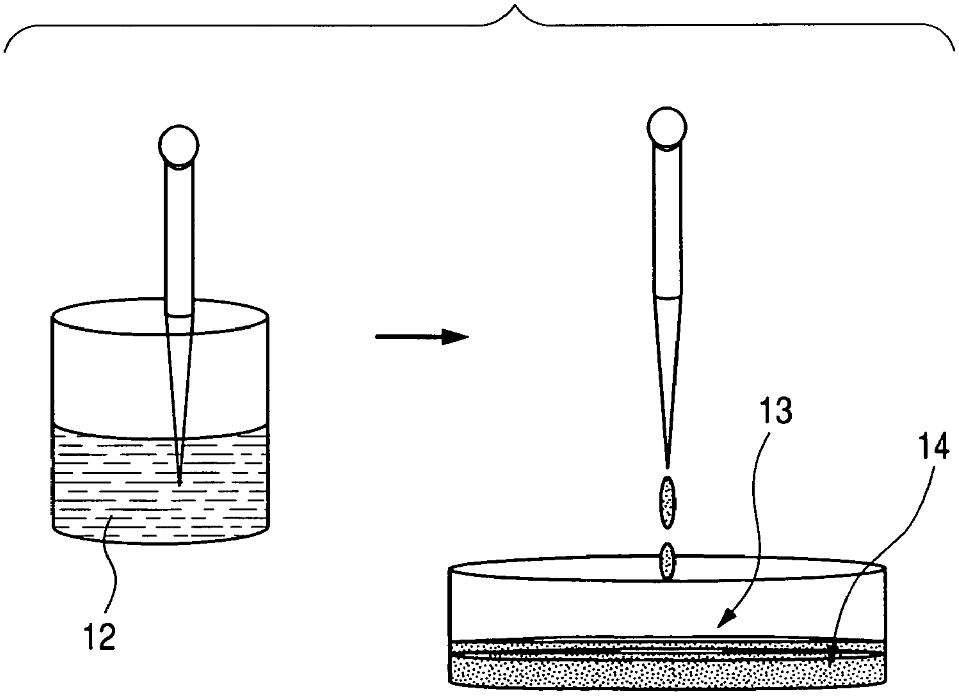
FIG. 4 is a schematic view illustrating one example of a sealing method for a $^{210}Pb$—$^{210}Po$ thin film according to the present invention.

The fourth step comprises a process in which a radioactive thin film is sealed for protection, wherein first a new PC filter is dissolved in a preferably 1:1 mixed solvent 12 of dichloroethane and dichloromethane. This is then adequately dried for sealing until an interference fringe ring of a coating 13 can be observed. Once drying has been confirmed, the solution is dripped onto the $^{210}$Pb—$^{210}$Po thin film 14 formed in the above-described step and simultaneously adequately dried to form a thin film of 1 micron or lower. The specific procedure of this method is illustrated in FIG. 4.

In the production method of a sealed $^{210}$Pb—$^{210}$Po α source (α particle emitter) according to the present invention, the metallic atomic weight of the $^{210}$Pb and $^{210}$Po can be controlled by controlling the drip amount of the solution in which metal atoms are dissolved. The specific order of procedures is as follows.

1. Measure the weight of the membrane filter;

2. Measure the number of the $^{210}$Pb—$^{210}$Po atoms trapped by the membrane filter;

This measurement is carried out by measuring gamma radiation that the trapped $^{210}$Pb—$^{210}$Po emits.

3. Measure the weight (mass) of the solution which dissolves the filter;

4. Determine the concentration of $^{210}$Pb—$^{210}$Po in solution from the number of trapped atoms of the $^{210}$Pb—$^{210}$Po and the weight of the solution;

5. Determine the necessary α particle number, calculate the amount of solution which corresponds to this α particle number, and drip the equivalent amount onto a predetermined position using a pipette or the like;

6. Dry the dripped portion to evaporate off organic solvent.

The present invention can be practiced in a large number of aspects without departing from its essential characteristics. Therefore, the above-described embodiments are only illustrative of the present invention, and is in no way restrictive thereto.

Advantages

The present invention can provide a method for producing a sealed α emitter source, and an apparatus thereof, which uses already established reliable technology which is easy to use and low-cost. For this reason, the inevitable rise in costs can be remarkably suppressed.

The invention claimed is:

1. A method for producing a sealed $^{210}$Pb—$^{210}$Po α source (α particle emitter) comprising the steps of:

collecting $^{210}$Pb—$^{210}$Po with a $^{210}$Pb collector using radon collection;

precipitating the hydroxides of the collected $^{210}$Pb—$^{210}$Po and collecting the precipitates using a polycarbonate (PC) filter;

dissolving the $^{210}$Pb—$^{210}$Po hydroxide precipitates to form a $^{210}$Pb—$^{210}$Po radioactive thin film; and sealing the $^{210}$Pb—$^{210}$Po radioactive thin film for protection.

2. The method for producing a sealed $^{210}$Pb—$^{210}$Po α source (α particle emitter) according to claim 1, wherein the step of collecting $^{210}$Pb—$^{210}$Po with a $^{210}$Pb collector using radon collection is a $^{210}$Pb—$^{210}$Po collection process characterized in that a substance containing uranium series radioactive nuclides is used as a $^{222}$Rn source, $^{222}$Rn generated from the $^{222}$Rn source is passed along with a carrier gas through a cold trap that is cooled to a temperature at or below a boiling point of $^{222}$Rn (−62° C.) to liquefy the $^{222}$Rn, and $^{210}$Pb—$^{210}$Po among daughter nuclides generated by the decay of the liquefied $^{222}$Rn is collected by taking the $^{210}$Pb—$^{210}$Po adhering to the cold trap wall sides or remaining in the cold trap, which has returned to room temperature, into a solution using a solvent for collecting.

3. The production method according to claim 2, wherein the $^{222}$Rn source is selected from the group consisting of natural uranium ore powder and a radium source.

4. The production method according to claim 2, wherein the carrier gas is selected from the group consisting of nitrogen and dry air.

5. The production method according to claim 2, wherein the solvent for dissolving $^{210}$Pb—$^{210}$Po is selected from the group consisting of nitric acid, sulfuric acid and hydrochloric acid solution.

6. The method for producing a sealed $^{210}$Pb—$^{210}$Po α source (α particle emitter) according to claim 1, wherein the step of precipitating the hydroxides of the collected $^{210}$Pb—$^{210}$Po and collecting the precipitates by a polycarbonate (PC) filter is a process in which the hydroxide precipitate is prepared by adding excess ammonium hydroxide solution to nitric acid, sulfuric acid or hydrochloric acid solution containing 210Pb and 210Po which is a nuclide generated from decay of 210Pb, the precipitate is settled, and then the 210Pb and 210Po made into a hydroxide precipitate is collected using the PC filter.

7. The method for producing a sealed $^{210}$Pb—$^{210}$Po α source (α particle emitter) according to claim 1, wherein the step of dissolving the $^{210}$Pb—$^{210}$Po hydroxide precipitate to form a $^{210}$Pb—$^{210}$Po radioactive thin film is a process in which the PC filter that has collected 210Pb and 210Po as hydroxide precipitate is dissolved in a mixed solvent of dichloroethane and dichloromethane, and the resultant solution is dripped to form a thin film of 1 micron or less by natural evaporation of the solution.

8. The production method according to claim 7, wherein the mixing ratio of the dichloroethane and dichloromethane is 1:1.

9. A method for producing a sealed $^{210}$Pb—$^{210}$Po α source (α particle emitter) comprising the steps of:

collecting $^{210}$Pb—$^{210}$Po with a $^{210}$Pb collector using radon collection;

precipitating the hydroxides of the collected $^{210}Pb$—$^{210}Po$ and collecting the precipitates using a polycarbonate (PC) filter;

dissolving the $^{210}Pb$—$^{210}Po$ hydroxide precipitates to form a $^{210}Pb$—$^{210}Po$ radioactive thin film; and sealing the $^{210}Pb$—$^{210}Po$ radioactive thin film for protection, wherein the step of sealing the $^{210}Pb$—$^{210}Po$ radioactive thin film for protection is a process in which a separate PC filter is dissolved in a mixed solvent of dichloroethane and dichloromethane, and the resultant solution is dripped onto a thin film prepared in accordance with the process of claim 7 to form a thin film of 1 micron or less.

10. The production method according to claim 9, wherein the mixing ratio of dichloroethane and dichloromethane is 1:1.

11. The method for producing a sealed $^{210}Pb$—$^{210}Po$ $\alpha$ source ($\alpha$ particle emitter) according to claim 7, characterized in that the content of $^{210}Pb$—$^{210}Po$ atoms is controlled by controlling the solution amount extracted for dripping.

12. The method for producing a sealed $^{210}Pb$—$^{210}Po$ $\alpha$ source ($\alpha$ particle emitter) according to claim 8, characterized in that the content of $^{210}Pb$—$^{210}Po$ atoms is controlled by controlling the solution amount extracted for dripping.

13. The method for producing a sealed $^{210}Pb$—$^{210}Po$ $\alpha$ source ($\alpha$ particle emitter) according to claim 9, characterized in that the content of $^{210}Pb$—$^{210}Po$ atoms is controlled by controlling the solution amount extracted for dripping.

14. The method for producing a sealed $^{210}Pb$—$^{210}Po$ $\alpha$ source ($\alpha$ particle emitter) according to claim 10, characterized in that the content of $^{210}Pb$—$^{210}Po$ atoms is controlled by controlling the solution amount extracted for dripping.

* * * * *